(12) United States Patent
Zayas et al.

(10) Patent No.: US 7,739,318 B2
(45) Date of Patent: Jun. 15, 2010

(54) SYSTEM AND METHOD FOR MAINTAINING MAPPINGS FROM DATA CONTAINERS TO THEIR PARENT DIRECTORIES

(75) Inventors: Edward R. Zayas, Milpitas, CA (US); Thomas Haynes, Tulsa, OK (US); John Francis Gillono, North Chelmsford, MA (US); Andy C. Kahn, San Francisco, CA (US); Sreelatha S. Reddy, Sunnyvale, CA (US)

(73) Assignee: NetApp, Inc., Sunnyvale, CA (US)

( * ) Notice: Subject to any disclaimer, the term of this patent is extended or adjusted under 35 U.S.C. 154(b) by 362 days.

(21) Appl. No.: 11/156,679

(22) Filed: Jun. 20, 2005

(65) Prior Publication Data

US 2006/0288026 A1    Dec. 21, 2006

(51) Int. Cl.
G06F 7/00 (2006.01)
(52) U.S. Cl. ............... 707/999.101; 707/999.102; 707/999.201; 711/112; 709/214; 709/225
(58) Field of Classification Search ............. None
See application file for complete search history.

(56) References Cited

U.S. PATENT DOCUMENTS

| | | | |
|---|---|---|---|
| 4,156,907 A | 5/1979 | Rawlings et al. |
| 4,399,503 A | 8/1983 | Hawley |
| 4,598,357 A | 7/1986 | Swenson et al. |
| 4,688,221 A | 8/1987 | Nakamura et al. |
| 4,698,808 A | 10/1987 | Ishii |
| 4,761,785 A | 8/1988 | Clark et al. |
| 4,805,090 A | 2/1989 | Coogan |
| 4,837,675 A | 6/1989 | Bean et al. |
| 4,864,497 A | 9/1989 | Lowry et al. |
| 4,896,259 A | 1/1990 | Jacobs et al. |
| 4,899,342 A | 2/1990 | Potter et al. |
| 4,989,206 A | 1/1991 | Dunphy, Jr. et al. |
| 5,124,987 A | 6/1992 | Milligan et al. |
| RE34,100 E | 10/1992 | Hartness |
| 5,155,835 A | 10/1992 | Belsan |
| 5,426,747 A | 6/1995 | Weinreb et al. |

(Continued)

FOREIGN PATENT DOCUMENTS

WO    WO 89/10594    11/1989

OTHER PUBLICATIONS

Administration Guide found at http://www.openafs.org/pages/doc/AdminGuide/auagd010.htm, visited on Mar. 2, 2005.

(Continued)

*Primary Examiner*—Don Wong
*Assistant Examiner*—Shyue Jiunn Hwa
(74) *Attorney, Agent, or Firm*—Cesari and McKenna, LLP

(57) ABSTRACT

A system and method maintains mappings from data containers to their parent directories within a file system of a storage system. Each inode is modified to include a primary name data structure comprising a parent directory inode and a parent directory cookie value. The parent directory cookie value identifies a particular directory entry within a specified block of a directory identified by parent directory inode. An alternate name file is utilized to store alternate names, such as those associated with hard links.

11 Claims, 10 Drawing Sheets

U.S. PATENT DOCUMENTS

| | | | |
|---|---|---|---|
| 5,568,629 | A | 10/1996 | Gentry et al. |
| 5,581,724 | A | 12/1996 | Belsan et al. |
| 5,742,817 | A * | 4/1998 | Pinkoski ............... 707/200 |
| 5,819,292 | A | 10/1998 | Hitz et al. |
| 6,230,200 | B1 * | 5/2001 | Forecast et al. ............ 709/226 |
| 6,516,380 | B2 | 2/2003 | Kenchammana-Hoskote et al. |
| 6,636,879 | B1 | 10/2003 | Doucette et al. |
| 6,643,654 | B1 | 11/2003 | Patel et al. |
| 6,671,773 | B2 * | 12/2003 | Kazar et al. ............... 711/112 |
| 6,775,679 | B2 * | 8/2004 | Gupta ................... 707/102 |
| 7,043,488 | B1 * | 5/2006 | Baer et al. ................ 707/101 |
| 7,043,493 | B2 * | 5/2006 | Guthery .................. 707/101 |
| 7,103,616 | B1 * | 9/2006 | Harmer et al. ............. 707/201 |
| 7,171,469 | B2 * | 1/2007 | Ackaouy et al. ........... 709/225 |
| 7,194,597 | B2 | 3/2007 | Willis et al. |
| 7,272,613 | B2 * | 9/2007 | Sim et al. ................. 707/102 |
| 7,386,674 | B1 * | 6/2008 | Lango .................... 711/137 |
| 2004/0030668 | A1 | 2/2004 | Pawlowski et al. |
| 2004/0054748 | A1 * | 3/2004 | Ackaouy et al. ........... 709/214 |
| 2004/0059866 | A1 * | 3/2004 | Patel et al. ................ 711/100 |
| 2005/0192932 | A1 * | 9/2005 | Kazar et al. .................. 707/1 |
| 2005/0246401 | A1 | 11/2005 | Edwards et al. |
| 2006/0085481 | A1 * | 4/2006 | Pallapotu ................. 707/200 |
| 2006/0179037 | A1 * | 8/2006 | Turner et al. ................. 707/3 |
| 2006/0248088 | A1 * | 11/2006 | Kazar et al. ................ 707/10 |
| 2006/0248273 | A1 * | 11/2006 | Jernigan et al. ............ 711/114 |
| 2006/0248379 | A1 * | 11/2006 | Jernigan, IV ................ 714/6 |
| 2006/0277221 | A1 * | 12/2006 | Zavisca et al. ............. 707/201 |
| 2007/0088702 | A1 | 4/2007 | Fridella et al. |

OTHER PUBLICATIONS

Basilico, et al., *Error Correction System Using "Shadow Memory,"* IBM Technical Disclosure Bulletin, May 1984, pp. 5792-5793.

Bitton, Dina, *Disk Shadowing*, Proceedings of the 14$^{th}$ VLDB Conference, LA, CA (1988).

Blasgen, M.W. et al., *System R:An architectural Overview*,Reprinted from IBM Systems Journal vol. 20, No. 1, 1981 © 1981, 1999.

Borenstein, Nathaniel S., *CMU's Andrew project a retrospective*, Communications of ACM, (39)12, Dec. 1996.

Brown, Mark R. et al., *The Alpine file system*, ACM Transactions on Computing Systems, 3(4):261-293, Nov. 1985.

Chen, Peter M., et al., *An Evaluation of Redundant Arrays of Disks Using an Amdahl 5890* Performance Evaluation, pp. 74-85, 1990.

Chutani, Sailesh, et al., *The Episode file system*, In Proceedings of the USENIX Winter 1992.

Clark, B.E., et al., *Application System /400 Performance Characteristics*, IBM Systems Journal, 28(3): 407-423, 1989.

Data Sheet for the Check Point Software Technologies product Flood-Gate-1 (1997).

Dibble, Peter C., et al., *Beyond Striping: The Bridge Multiprocessor File System*, Computer Science Department, University of Rochester, Aug. 11, 1989.

Douglis, Fred, et al., *A comparison of two distributed systems: Amoeba and Sprite*—Computing Systems, 4(4), Fall 1991, pp. 353-385 ?

Gait, Jason, *Phoenix: A Safe In-Memory File System*. Communications of the ACM, 33(1):81-86, Jan. 1990.

Hartman, John H. et al., *Performance Measurements of a Multiprocessor Sprite Kernel*, Proceedings of the USENIX Conference, 1990.

Hitz, Dave et al., *File System Design for an NFS File Server Appliance*, Technical Report 3002, Rev. C395, presented Jan. 19, 1994.

Hitz, David, et al. *System and Method for Enabling a Storage System to Support Multiple Volume Formats Simultaneously*, USPTO U.S. Appl. No. 60/652,626, filed Feb. 14, 2005.

Howard, John H, et al. *Scale and Performance in a Distributed File System*, Carnegie Mellon University, CMU-ITC-87-068, Aug. 5, 1987.

Howard, John, H. et al., *Scale and performance in a distributed file system*, ACM Trans. Computer. System., 6(1), Feb. 1988 pp. 51-81.

Howard, John H., *An Overview of the Andrew File System*, Carnegie Mellon University, CMU-ITC-88-062.

*The IBM System/38*, Chapter 8, pp. 137-15.

Isomaki, Markus, *Differentiated Service for the Internet*, Department of Technical Physics and Mathematics, May 9, 1998.

Kazar, Michael L., et al., *Decorum File System Architectural Overview*, USENIX Summer Conference, Anaheim, California, 1990.

Lomet, David., et al., *The performance of a multiversion access method*, ACM SIGMOD International Conference on Management of Data, 19:353-363.

Lorie, Raymond, A, *Physical integrity in a large segmented database*, ACM Trans. Database Systems, (2)1: 91-104, Mar. 1977.

Lorie, RA, *Shadow Page Mechanism*, IBM Technical Disclosure Bulletin, Jun. 1986, pp. 340-342.

McKusick, Marshall Kirk, et al., *A Fast File System for UNIX*, Computer Science Division, Department of Electrical Engineering and Computer Sciences, Univ. of CA, Berkley, Feb. 18, 1994.

Miller, Ethan L., et al., *RAMA:A File System for Massively Parallel Computers*, 12$^{th}$ IEEE Symposium on Mass Storage Systems, Monterey CA, Apr. 1993, pp. 163-168.

Moons, Herman et al., *Location-Independent Object Invocation in Open Distributed Systems*, Autumn 1991 EurOpen Technical Conference and Exhibition, pp. 287-300 (Sep. 16-20, 1991).

Morris, James H., Et Al, *Andrew: A Distributed Personal Computing Environment*, Comm. of the ACM, vol. 29, Mar. 1986, pp. 184-201.

Mullender, Sape J., et al., *A distributed file service based on optimistic concurrency control*, ACM Symposium on Operating System Principles (Orcas Island, Washington). Published as Operating Systems Review, 19(5):51-62, Dec. 1985.

Muller, Keith, et al., *A High Performance Multi-Structured File System Design*, In Proceedings of the 13th ACM Symposium on Operating Systems Principles, Oct. 1991, pp. 56-67.

Ousterhout, John K. et al., *The Sprite Network Operating System*, Computer Science Division, Department of Electrical Engineering and Computer Sciences, Univ. of CA, Berkley, Nov. 19, 1987.

Ousterhout, John et al., *Beating the I/O Bottleneck: A Case for Log-Structured File Systems*, Technical Report, Computer Science Division, Electrical Engineering and Computer Sciences, University of California at Berkeley, Oct. 30, 1988.

Ousterhout, John, *Why Aren't Operating Systems Getting Faster as Fast as Hardware?*, Digital WRL Technical Note TN-11, Oct. 1989.

Ousterhout, John, *A Brief Retrospective on the Sprite Network Operating System*, found at http://www.cs.berkeley.edu/projects/sprite/retrospective.html,visited on Mar. 11, 2005.

Patterson, D., et al., *A Case for Redundant Arrays of Inexpensive Disks (RAID)*, Technical Report, CSD-87-391, Computer Science Division, Electrical Engineering and Computer Sciences, University of California at Berkeley (1987).

Patterson, D., et al., *A Case for Redundant Arrays of Inexpensive Disks (RAID)*, SIGMOD International Conference on Management of Data, Chicago, IL, USA, Jun. 1-3, 1988, SIGMOD Record (17)3:109-16 (Sep. 1988).

Peterson, Zachary Nathaniel Joseph, *Data Placement for Copy-on-Write Using Virtual Contiguity*, University of CA, Santa Cruz, Master of Science in Computer Science Thesis, Sep. 2002.

Quinlan, Sean, *A Cached WORM File System*, Software-Practice and Experience, 21(12):1289-1299 (1991).

Redundant Array of Independent Disks, from Wikipedia, the free encyclopedia, found at http://en.wikipedia.org/wiki/RAID, visited on Mar. 9, 2005.

Rosenberg, J., et al., *Stability in a Persistent Store Based on a Large Virtual Memory*, In Security and Persistence, Rosenber, J. & Keedy, J.L. (ed), Springer-Verlag (1990) pp. 229-245.

Rosenblum, Mendel, et al., *The LFS Storage Manager*, Computer Science Division, Electrical Engin. and Computer Sciences, Univ. of CA, presented at Summer '90 USENIX Technical Conference, Anaheim, CA Jun. 1990.

Rosenblum, Mendel, et al, The *Design and Implementation of a Log-Structured File System* Jul. 24, 1991 pp. 1-15.

Rosenblum, Mendel, et al., *The Design and Implementation of a Log-Structured File System*, , In Proceedings of ACM Transactions on Computer Systems, (10)1:26-52, Feb. 1992.

Sandberg, Russel et al., *Design and implementation of the Sun Network Filesystem*. In Proc. Summer 1985 USENIX Conf., pp. 119-130, Portland OR (USA), Jun. 1985.

Santry, Douglas S., et al., *Deciding When to Forget in the Elephant File System*, Operating Systems Review, 34(5), (Dec. 1999) pp. 110-123.

Satyanarayanan, M., et al., *The ITC Distributed File System: Principles and Design*, In Proceedings of the 10th ACM Symposium on Operating Systems Principles, (19)5:56-67, Dec. 1985.

Satyanarayanan,.M.. *A survey of distributed file-systems*. Annual Review of Computing Science, 4(73-104), 1989.

Satyanarayanan, M., et al, *Coda: A highly available file system for a distributed workstation environment* Carnegie Mellon University, CMU-ITC.

Satyanarayanan, M., et al, *Coda: A highly available file system for a distributed workstation environment*. IEEE Transactions on Computers, 39(4):447-459, 1990.

Satyanarayanan, Mahadev, *Scalable, Secure, and Highly Available Distributed File Access*, Computer May 1990: 9-21.

Sidebotham, Bob, *Volumes: The Andrew File System Data Structuring Primitive*, EEUG Conference Proceedings, Manchester, UK, Autumn 1986.

User Guide found at http://www.openafs.org/pages/doc/UserGuide/auusg004.htm, visited on Mar. 2, 2005.

Welch, Brent B., et al., *Pseudo Devices: User-Level Extensions to the Sprite File System*, Computer Science Division, Department of Electrical Engineering and Computer Sciences, Univ. of CA, Berkley, Apr. 1988.

Welch, Brent B., et al., *Pseudo-File-Systems*, Computer Science Division, Department of Electrical Engineering and Computer Sciences, Univ. of CA, Berkley, Oct. 1989.

Wittle, Mark, et al, *LADDIS: The next generation in NFS file server benchmarking*, USENIX Association Conference Proceedings, Apr. 1993.

\* cited by examiner

SYSTEM AND METHOD FOR MAINTAINING MAPPINGS FROM DATA CONTAINERS TO THEIR PARENT DIRECTORIES

FIELD OF THE INVENTION

The present invention relates to file systems and, more specifically, to a file system architecture that maintains mappings from data containers to their corresponding parent directories.

BACKGROUND OF THE INVENTION

A storage system typically comprises one or more storage devices into which information may be entered, and from which information may be obtained, as desired. The storage system includes a storage operating system that functionally organizes the system by, inter alia, invoking storage operations in support of a storage service implemented by the system. The storage system may be implemented in accordance with a variety of storage architectures including, but not limited to, a network-attached storage (NAS) environment, a storage area network (SAN) and a disk assembly directly attached to a client or host computer. The storage devices are typically disk drives organized as a disk array, wherein the term "disk" commonly describes a self-contained rotating magnetic media storage device. The term disk in this context is synonymous with hard disk drive (HDD) or direct access storage device (DASD).

Storage of information on the disk array is preferably implemented as one or more storage "volumes" of physical disks, defining an overall logical arrangement of disk space. The disks within a volume are typically organized as one or more groups, wherein each group may be operated as a Redundant Array of Independent (or Inexpensive) Disks (RAID). Most RAID implementations enhance the reliability/integrity of data storage through the redundant writing of data "stripes" across a given number of physical disks in the RAID group, and the appropriate storing of redundant information (parity) with respect to the striped data. The physical disks of each RAID group may include disks configured to store striped data (i.e., data disks) and disks configured to store parity for the data (i.e., parity disks). The parity may thereafter be retrieved to enable recovery of data lost when a disk fails. The term "RAID" and its various implementations are well-known and disclosed in *A Case for Redundant Arrays of Inexpensive Disks (RAID)*, by D. A. Patterson, G. A. Gibson and R. H. Katz, Proceedings of the International Conference on Management of Data (SIGMOD), June 1988.

The storage operating system of the storage system may implement a high-level module, such as a file system, to logically organize the information stored on the disks as a hierarchical structure of directories, files and blocks. For example, each "on-disk" file may be implemented as set of data structures, i.e., disk blocks, configured to store information, such as the actual data for the file. These data blocks are organized within a volume block number (vbn) space that is maintained by the file system. The file system organizes the data blocks within the vbn space as a "logical volume"; each logical volume may be, although is not necessarily, associated with its own file system. The file system typically consists of a contiguous range of vbns from zero to n, for a file system of size n+1 blocks.

A known type of file system is a write-anywhere file system that does not over-write data on disks. If a data block is retrieved (read) from disk into a memory of the storage system and "dirtied" (i.e., updated or modified) with new data, the data block is thereafter stored (written) to a new location on disk to optimize write performance. A write-anywhere file system may initially assume an optimal layout such that the data is substantially contiguously arranged on disks. The optimal disk layout results in efficient access operations, particularly for sequential read operations, directed to the disks. An example of a write-anywhere file system that is configured to operate on a storage system is the Write Anywhere File Layout (WAFL®) file system available from Network Appliance, Inc., of Sunnyvale, Calif.

The storage system may be configured to operate according to a client/server model of information delivery to thereby allow many clients to access the directories, files and blocks stored on the system. In this model, the client may comprise an application, such as a database application, executing on a computer that "connects" to the storage system over a computer network, such as a point-to-point link, shared local area network, wide area network or virtual private network implemented over a public network, such as the Internet. Each client may request the services of the file system by issuing file system protocol messages (in the form of packets) to the storage system over the network. By supporting a plurality of file system protocols, such as the conventional Common Internet File System (CIFS) and the Network File System (NFS) protocols, the utility of the storage system is enhanced.

Each data container, such as a file, directory, etc., within a file system is typically associated with an inode that serves as the root of a buffer tree of the data container. The buffer tree is an internal representation of blocks for the data container stored in the memory of the storage system and maintained by the file system. The inode is a data structure used to store information, such as metadata, about the data container, whereas the data blocks are structures used to store the actual data for the container. The inode typically contains a set of pointers to other blocks within the file system. For data containers, such as files, that are sufficiently small, the inode may directly point to blocks storing the data of the file. However, for larger files, the inode points to one or more levels of indirect blocks, which, in turn, may point to additional levels of indirect blocks and/or the blocks containing the data.

Certain events occurring within the storage system and/or a storage operating system executing thereon may result in a message being displayed to an administrator. For example, the storage system may detect that one or more data containers have become corrupted. A pathname provides a way for the administrator to refer to a data container served by the storage system. To that end, each pathname typically represents one data container within the hierarchical structure of the file system. However, the storage system typically reports the identity of the data container to the administrator by using its associated inode number. The inode number is used internally within the file system to identify the inode associated with the data container and, unfortunately, is not easily understood by humans. It is therefore desirous for the administrator to know the pathname of the data container to which the message relates so that appropriate action may be taken.

A "brute force" technique to identify the pathname of a data container associated with a specific inode number is for an administrator to utilize a client, such as a network file system (NFS) client, to traverse ("walk") the buffer trees of the file system and access ("open") every data container within the file system. Upon opening a data container, the inode number associated with the data container is returned to the client. Thus, the client may have to walk the entire file system until an open data container operation returns the same inode number as that identified by the message. Such a brute force approach is extremely computationally, disk and network intensive and, as a file system may contain tens or hundreds of millions of data containers, time intensive. Additionally, the NFS client may not be able to access every data container due to, e.g., access controls, while certain data containers may not be NFS accessible, such as virtual disks (vdisks).

Another limitation is that multiple names in the file system may reference the same inode. For example, a data container, such as a file, is created in the file system in a particular directory and associated with a specific name. At some later point in time a hard link is generated that references the previously generated file, which results in a separate name being associated with the inode. A system administrator may want to know all of the names associated with an inode. Thus, a technique is needed that enables inode to pathname (I2P) mapping to thereby allow rapid identification of all names associated with a particular inode.

Certain storage system vendors have implemented various forms of I2P mapping functionality. For example, the Novell NetWare system stores character strings of all of the names associated with an inode within the inode itself. However, inodes are typically fixed sized data structures and if a sufficient number of names are associated with an inode, additional "spill over" inodes must be allocated for the data container. Such a solution increases the complexity of managing data and utilizes extra and valuable inode numbers, which may be limited within the file system.

Alternately, the Solaris operating system, available from Sun Microsystems, Inc., stores a pathname in the in-memory vnode data structure. However, modifications to the names of any directories in the pathname are not updated in the cached path within the vnode. Should a directory be renamed, the cached pathname data within the vnode data structure is not updated, which can result in incorrect pathnames being presented to an administrator. Another noted disadvantage is that no pathname information is stored persistently.

SUMMARY OF THE INVENTION

The present invention overcomes the disadvantages of the prior art by providing a system and method for maintaining efficient inode to pathname (I2P) mapping from a data container to its parent directory within a file system of a storage system. A metadata section of each inode is modified to include a primary name data structure that illustratively comprises the inode number associated with the parent directory of the data container (a "parent directory inode") and a parent directory cookie value. The parent directory cookie value is illustratively a multi-byte value that identifies a specific directory block and entry within the directory structure in that block associated with the parent directory inode. To identify the pathname of the data container, the file system includes a set of I2P functions that cooperate to load the identified directory entry using the information stored in the primary name data structure. This I2P information may then be utilized in displaying the primary name of the data container to, e.g, an administrator.

Additionally, an alternate name file is generated and stored in a hidden metadata directory of the file system. The alternate name file illustratively utilizes a B+ tree design wherein each key is a triplet comprising the inode number of the data container, a parent directory inode number and a cookie value. The inode number identifies the inode of the data container to which this name refers. The parent directory inode and cookie value identify a directory, block and directory entry containing the leaf of the pathname associated with the alternative name, thereby allowing the full pathname to be easily determined by walking up the parent entries in a well-known location in each directory.

BRIEF DESCRIPTION OF THE DRAWINGS

The above and further advantages of the invention may be better understood by referring to the following description in conjunction with the accompanying drawings in which like reference numerals indicate identical or functionally similar elements.

DETAILED DESCRIPTION OF AN ILLUSTRATIVE EMBODIMENT

A. Storage System Environment

Figure 1:
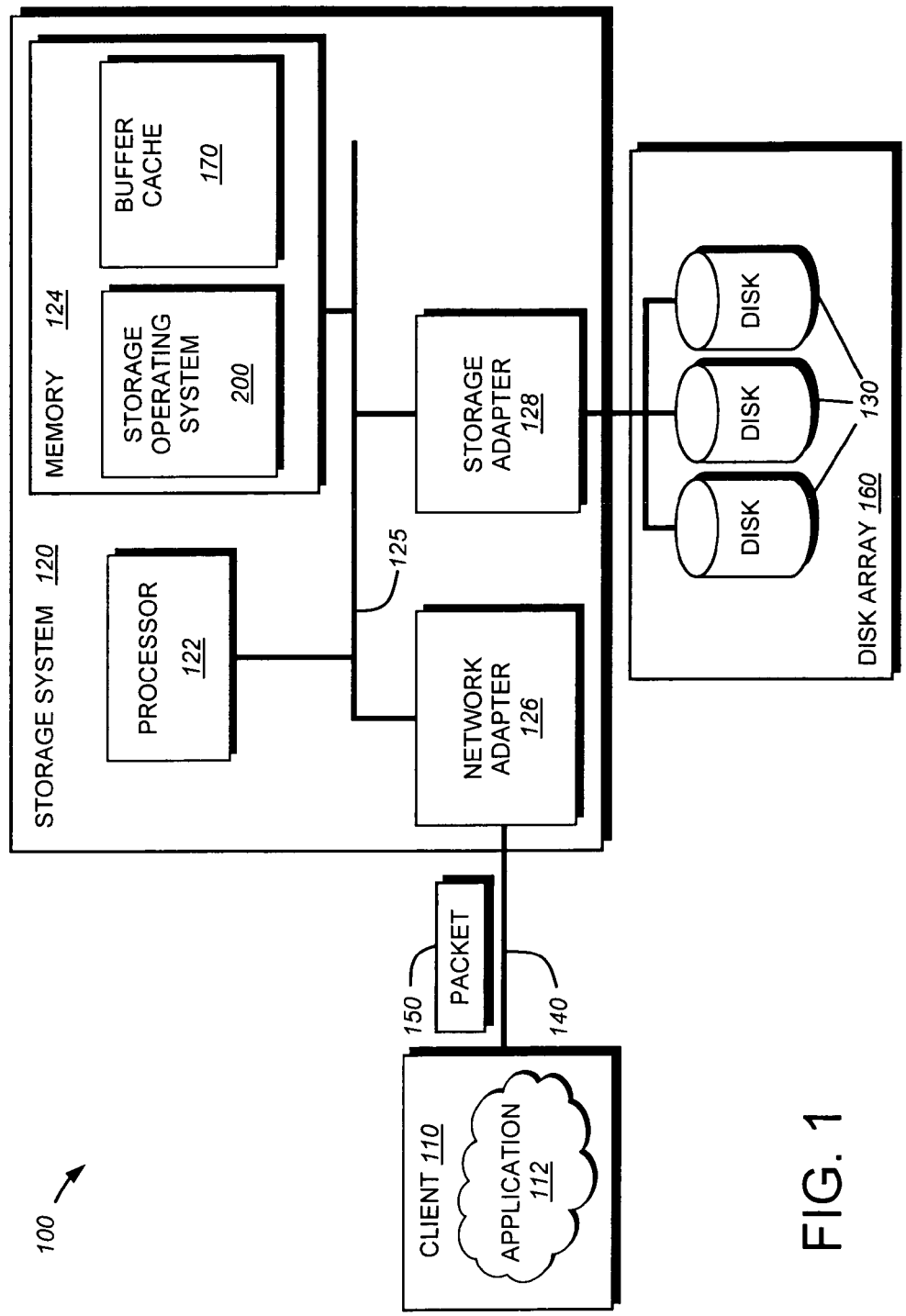
FIG. 1 is a schematic block diagram of an exemplary storage system environment in accordance with an embodiment of the present invention.

FIG. 1 is a schematic block diagram of an environment 100 including a storage system 120 that may be advantageously used with the present invention. The storage system is a computer that provides storage service relating to the organization of information on storage devices, such as disks 130 of a disk array 160. The storage system 120 comprises a processor 122, a memory 124, a network adapter 126 and a storage adapter 128 interconnected by a system bus 125. The storage system 120 also includes a storage operating system 200 that preferably implements a high-level module, such as a file system, to logically organize the information as a hierarchical structure of directories, files and virtual disks ("vdisks") on the disks.

In the illustrative embodiment, the memory 124 comprises storage locations that are addressable by the processor and adapters for storing software program code. A portion of the memory may be further organized as a "buffer cache" 170 for storing certain data structures associated with the present invention. The processor and adapters may, in turn, comprise processing elements and/or logic circuitry configured to execute the software code and manipulate the data structures. Storage operating system 200, portions of which are typically resident in memory and executed by the processing elements, functionally organizes the system 120 by, inter alia, invoking storage operations executed by the storage system. It will be apparent to those skilled in the art that other processing and memory means, including various computer readable media, may be used for storing and executing program instructions pertaining to the inventive technique described herein.

The network adapter 126 comprises the mechanical, electrical and signaling circuitry needed to connect the storage system 120 to a client 110 over a computer network 140, which may comprise a point-to-point connection or a shared medium, such as a local area network. Illustratively, the computer network 140 may be embodied as an Ethernet network or a Fibre Channel (FC) network. The client 110 may communicate with the storage system over network 140 by exchanging discrete frames or packets of data 150 according to pre-defined protocols, such as the Transmission Control Protocol/Internet Protocol (TCP/IP).

The client 110 may be a general-purpose computer configured to execute applications 112. Moreover, the client 110 may interact with the storage system 120 in accordance with a client/server model of information delivery. That is, the client may request the services of the storage system, and the system may return the results of the services requested by the client, by exchanging packets 150 over the network 140. The clients may issue packets including file-based access protocols, such as the Common Internet File System (CIFS) protocol or Network File System (NFS) protocol, over TCP/IP when accessing information in the form of files and directories. Alternatively, the client may issue packets including block-based access protocols, such as the Small Computer Systems Interface (SCSI) protocol encapsulated over TCP (iSCSI) and SCSI encapsulated over Fibre Channel (FCP), when accessing information in the form of blocks.

The storage adapter 128 cooperates with the storage operating system 200 executing on the system 120 to access information requested by a user (or client). The information may be stored on any type of attached array of writable storage device media such as video tape, optical, DVD, magnetic tape, bubble memory, electronic random access memory, micro-electro mechanical and any other similar media adapted to store information, including data and parity information. However, as illustratively described herein, the information is preferably stored on the disks 130, such as HDD and/or DASD, of array 160. The storage adapter includes input/output (I/O) interface circuitry that couples to the disks over an I/O interconnect arrangement, such as a conventional high-performance, FC serial link topology.

Storage of information on array 160 is preferably implemented as one or more storage "volumes" that comprise a collection of physical storage disks 130 cooperating to define an overall logical arrangement of volume block number (vbn) space on the volume(s). Alternately, the information may be implemented as one or more aggregates comprising of one or more virtual volumes. Aggregates and virtual volumes are described in detail in U.S. patent application Ser. No. 10/836,817, entitled EXTENSION OF WRITE ANYWHERE FILE SYSTEM LAYOUT, by John K. Edwards, et al.

The disks within the file system are typically organized as one or more groups, wherein each group may be operated as a Redundant Array of Independent (or Inexpensive) Disks (RAID). Most RAID implementations, such as a RAID-4 level implementation, enhance the reliability/integrity of data storage through the redundant writing of data "stripes" across a given number of physical disks in the RAID group, and the appropriate storing of parity information with respect to the striped data. An illustrative example of a RAID implementation is a RAID-4 level implementation, although it should be understood that other types and levels of RAID implementations may be used in accordance with the inventive principles described herein.

B. Storage Operating System

To facilitate access to the disks 130, the storage operating system 200 illustratively implements a write-anywhere file system that cooperates with virtualization modules to "virtualize" the storage space provided by disks 130. The file system logically organizes the information as a hierarchical structure of named directories and files on the disks. Each "on-disk" file may be implemented as set of disk blocks configured to store information, such as data, whereas the directory may be implemented as a specially formatted file in which names and links to other files and directories are stored. The virtualization modules allow the file system to further logically organize information as a hierarchical structure of blocks on the disks that are exported as named logical unit numbers (luns).

In the illustrative embodiment, the storage operating system is preferably the NetApp® Data ONTAP™ operating system available from Network Appliance, Inc., Sunnyvale, Calif. that implements a Write Anywhere File Layout (WAFL®) file system. However, it is expressly contemplated that any appropriate storage operating system may be enhanced for use in accordance with the inventive principles described herein. As such, where the term "ONTAP" is employed, it should be taken broadly to refer to any storage operating system that is otherwise adaptable to the teachings of this invention.

Figure 2:
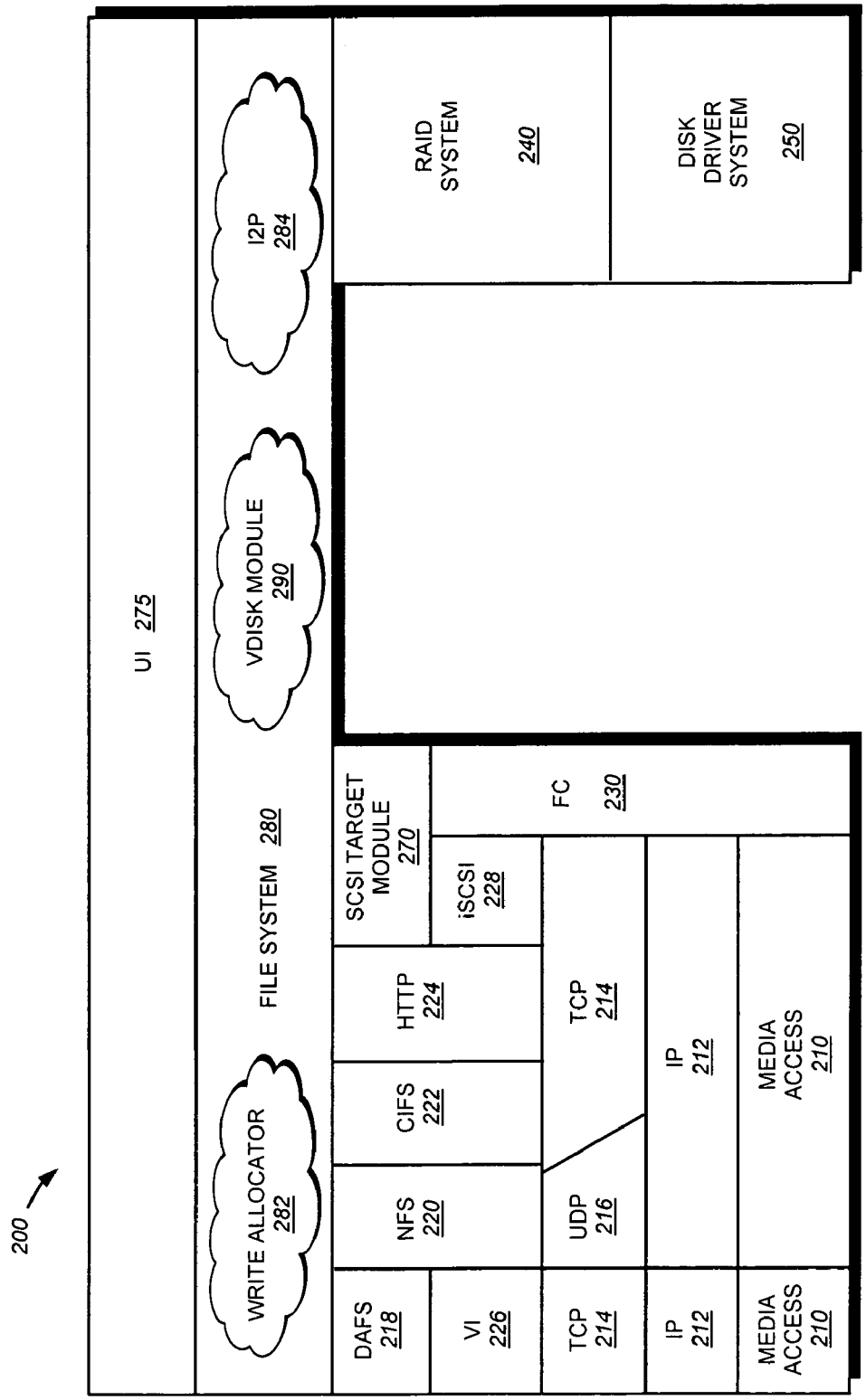
FIG. 2 is a schematic block diagram of a storage operating system in accordance with an embodiment of the present invention.

FIG. 2 is a schematic block diagram of the storage operating system 200 that may be advantageously used with the present invention. The storage operating system comprises a series of software layers organized to form an integrated network protocol stack or, more generally, a multi-protocol engine that provides data paths for clients to access information stored on the storage system using block and file access protocols. The protocol stack includes a media access layer 210 of network drivers (e.g., gigabit Ethernet drivers) that interfaces to network protocol layers, such as the IP layer 212 and its supporting transport mechanisms, the TCP layer 214 and the User Datagram Protocol (UDP) layer 216. A file system protocol layer provides multi-protocol file access and, to that end, includes support for, inter alia, the Direct Access File System (DAFS) protocol 218, the NFS protocol 220, the CIFS protocol 222 and the Hypertext Transfer Protocol (HTTP) protocol 224. A VI layer 226 implements the VI architecture to provide direct access transport (DAT) capabilities, such as RDMA, as required by the DAFS protocol 218.

An iSCSI driver layer 228 provides block protocol access over the TCP/IP network protocol layers, while a FC driver layer 230 receives and transmits block access requests and responses to and from the storage system. The FC and iSCSI drivers provide FC-specific and iSCSI-specific access control to the blocks and, thus, manage exports of luns to either iSCSI or FCP or, alternatively, to both iSCSI and FCP when accessing the blocks on the storage system. In addition, the storage operating system includes a storage module embodied as a RAID system 240 that manages the storage and retrieval of information to and from the volumes/disks in accordance with I/O operations, and a disk driver system 250 that implements a disk access protocol such as, e.g., the SCSI protocol.

Bridging the disk software layers with the integrated network protocol stack layers is a virtualization system that is implemented by a file system 280 interacting with virtualization modules illustratively embodied as, e.g., vdisk module 290 and SCSI target module 270. The vdisk module 290 cooperates with the file system 280 to enable access by administrative interfaces, such as a user interface (UI) 275, in response to a user (system administrator) issuing commands to the storage system. The SCSI target module 270 is disposed between the FC and iSCSI drivers 228, 230 and the file system 280 to provide a translation layer of the virtualization system between the block (lun) space and the file system space, where luns are represented as blocks. The UI 275 is disposed over the storage operating system in a manner that enables administrative or user access to the various layers and systems.

The file system is illustratively a message-based system that provides logical volume management capabilities for use in access to the information stored on the storage devices, such as disks. That is, in addition to providing file system semantics, the file system 280 provides functions normally associated with a volume manager. These functions include (i) aggregation of the disks, (ii) aggregation of storage bandwidth of the disks, and (iii) reliability guarantees, such as mirroring and/or parity (RAID). The file system 280 illustratively implements the WAFL file system (hereinafter generally the "write-anywhere file system") having an on-disk format representation that is block-based using, e.g., 4 kilobyte (KB) blocks and using index nodes ("inodes") to identify files and file attributes (such as creation time, access permissions, size and block location). The file system uses files to store metadata describing the layout of its file system; these metadata files include, among others, an inode file. A file handle, i.e., an identifier that includes an inode number, is used to retrieve an inode from disk.

Broadly stated, all inodes of the write-anywhere file system are organized into the inode file. Volume information (volinfo) and file system information (fsinfo) blocks specify the layout of information in the file system, the latter block including an inode of a file that includes all other inodes of the file system (the inode file). Each logical volume (file system) has an fsinfo block that is preferably stored at a fixed location within, e.g., a RAID group. The inode of the fsinfo block may directly reference (point to) blocks of the inode file or may reference indirect blocks of the inode file that, in turn, reference direct blocks of the inode file. Within each direct block of the inode file are embedded inodes, each of which may reference indirect blocks that, in turn, reference data blocks of a file.

Operationally, a request from the client 110 is forwarded as a packet 150 over the computer network 140 and onto the storage system 120 where it is received at the network adapter 126. A network driver (of layer 210 or layer 230) processes the packet and, if appropriate, passes it on to a network protocol and file access layer for additional processing prior to forwarding to the write-anywhere file system 280. Here, the file system generates operations to load (retrieve) the requested data from disk 130 if it is not resident "in-core", i.e., in the buffer cache 170. If the information is not in the cache, the file system 280 indexes into the inode file using the inode number to access an appropriate entry and retrieve a logical volume block number (vbn). The file system then passes a message structure including the logical vbn to the RAID system 240; the logical vbn is mapped to a disk identifier and disk block number (disk,dbn) and sent to an appropriate driver (e.g., SCSI) of the disk driver system 250. The disk driver accesses the dbn from the specified disk 130 and loads the requested data block(s) in buffer cache 170 for processing by the storage system. Upon completion of the request, the storage system (and operating system) returns a reply to the client 110 over the network 140.

Also included in the storage operating system 200 is a set of inode to pathname (I2P) functions 284. The I2P functions 284, in conjunction with the file system 280, illustratively implement the I2P functionality of the present invention. The I2P functions 284 may include various scanners, described further below, that operate to install/remove I2P mappings in accordance with embodiments of the present invention. Additionally, the I2P functions 284 may include an application program interface (API) that is exposed to enable other processes executing within the storage operating system to perform I2P mappings. The API may also be accessible via remote procedure calls (RPCs) to enable programs executing on other computers in network environment 100 to perform I2P mapping functions.

It should be noted that the software "path" through the storage operating system layers described above needed to perform data storage access for the client request received at the storage system may alternatively be implemented in hardware. That is, in an alternate embodiment of the invention, a storage access request data path may be implemented as logic circuitry embodied within a field programmable gate array (FPGA) or an application specific integrated circuit (ASIC). This type of hardware implementation increases the performance of the storage service provided by storage system 120 in response to a request issued by client 110. Moreover, in another alternate embodiment of the invention, the processing elements of adapters 126, 128 may be configured to offload some or all of the packet processing and storage access operations, respectively, from processor 122, to thereby increase the performance of the storage service provided by the system. It is expressly contemplated that the various processes, architectures and procedures described herein can be implemented in hardware, firmware or software.

As used herein, the term "storage operating system" generally refers to the computer-executable code operable to perform a storage function in a storage system, e.g., that manages data access and may implement file system semantics. In this sense, the ONTAP software is an example of such a storage operating system implemented as a microkernel and including the WAFL layer to implement the WAFL file system semantics and manage data access. The storage operating system can also be implemented as an application program operating over a general-purpose operating system, such as UNIX® or Windows XP®, or as a general-purpose operating system with configurable functionality, which is configured for storage applications as described herein.

In addition, it will be understood to those skilled in the art that the inventive technique described herein may apply to any type of special-purpose (e.g., file server, filer or storage appliance) or general-purpose computer, including a standalone computer or portion thereof, embodied as or including a storage system 120. An example of a storage appliance that may be advantageously used with the present invention is described in U.S. patent application Ser. No. 10/215,917 titled, MULTI-PROTOCOL STORAGE APPLIANCE THAT PROVIDES INTEGRATED SUPPORT FOR FILE AND BLOCK ACCESS PROTOCOLS, filed on Aug. 8, 2002. Moreover, the teachings of this invention can be adapted to a variety of storage system architectures including, but not limited to, a network-attached storage environment, a storage area network and disk assembly directly-attached to a client or host computer. The term "storage system" should therefore be taken broadly to include such arrangements in addition to any subsystems configured to perform a storage function and associated with other equipment or systems.

C. Volume Structure

The file system, such as the write-anywhere file system, maintains information about the geometry of the underlying physical disks (e.g., the number of blocks in each disk) in the storage system. The RAID system provides the disk geometry information to the file system for use when creating and maintaining the vbn-to-disk,dbn mappings used to perform write allocation operations. The file system maintains block allocation data structures, such as an active map, a space map, a summary map and snapmaps. These mapping data structures describe which blocks are currently in use and which are available for use and are used by a write allocator of the file system as existing infrastructure for the logical volume.

Specifically, the snapmap denotes a bitmap file describing which blocks are used by a snapshot. The write-anywhere file system (such as the WAFL file system) has the capability to generate a snapshot of its active file system. An "active file system" is a file system to which data can be both written and read or, more generally, an active store that responds to both read and write I/O operations. It should be noted that "snapshot" is a trademark of Network Appliance, Inc. and is used for purposes of this patent to designate a persistent consistency point (CP) image. A persistent consistency point image (PCPI) is a space conservative, point-in-time read-only image of data accessible by name that provides a consistent image of that data (such as a storage system) at some previous time. More particularly, a PCPI is a point-in-time representation of a storage element, such as an active file system, file or database, stored on a storage device (e.g., on disk) or other persistent memory and having a name or other identifier that distinguishes it from other PCPIs taken at other points in time. A PCPI can also include other information (meta-data) about the active file system at the particular point in time for which the image is taken. The terms "PCPI" and "snapshot" may be used interchangeably through out this patent without derogation of Network Appliance's trademark rights.

The write-anywhere file system supports (maintains) multiple PCPIs that are generally created on a regular schedule. Each PCPI refers to a copy of the file system that diverges from the active file system over time as the active file system is modified. Each PCPI is a restorable version of the storage element (e.g., the active file system) created at a predetermined point in time and, as noted, is "read-only" accessible and "space-conservative". Space conservative denotes that common parts of the storage element in multiple snapshots share the same file system blocks. Only the differences among these various PCPIs require extra storage blocks. The multiple PCPIs of a storage element are not independent copies, each consuming disk space; therefore, creation of a PCPI on the file system is instantaneous, since no entity data needs to be copied. Read-only accessibility denotes that a PCPI cannot be modified because it is closely coupled to a single writable image in the active file system. The closely coupled association between a file in the active file system and the same file in a PCPI obviates the use of multiple "same" files. In the example of a WAFL file system, PCPIs are described in *TR3002 File System Design for a NFS File Server Appliance* by David Hitz et al., published by Network Appliance, Inc. and in U.S. Pat. No. 5,819,292 entitled METHOD FOR MAINTAINING CONSISTENT STATES OF A FILE SYSTEM AND FOR CREATING USER-ACCESSIBLE READ-ONLY COPIES OF A FILE SYSTEM, by David Hitz et al., each of which is hereby incorporated by reference as though full set forth herein.

The active map denotes a bitmap file describing which blocks are used by the active file system. As previously described, a PCPI may contain metadata describing the file system as it existed at the point in time that the image was taken. In particular, a PCPI captures the active map as it existed at the time of PCPI creation; this file is also known as the snapmap for the PCPI. Note that a snapmap denotes a bitmap file describing which blocks are used by a PCPI. The summary map denotes a file that is an inclusive logical OR bitmap of all snapmaps. By examining the active and summary maps, the file system can determine whether a block is in use by either the active file system or any PCPI. The space map denotes a file including an array of numbers that describes the number of storage blocks used in a block allocation area. In other words, the space map is essentially a logical OR bitmap between the active and summary maps to provide a condensed version of available "free block" areas within the vbn space. Examples of PCPI and block allocation data structures, such as the active map, space map and summary map, are described in U.S. Patent Application Publication No. US2002/0083037 A1, titled INSTANT SNAPSHOT, by Blake Lewis et al. and published on Jun. 27, 2002, which application is hereby incorporated by reference.

Figure 3:
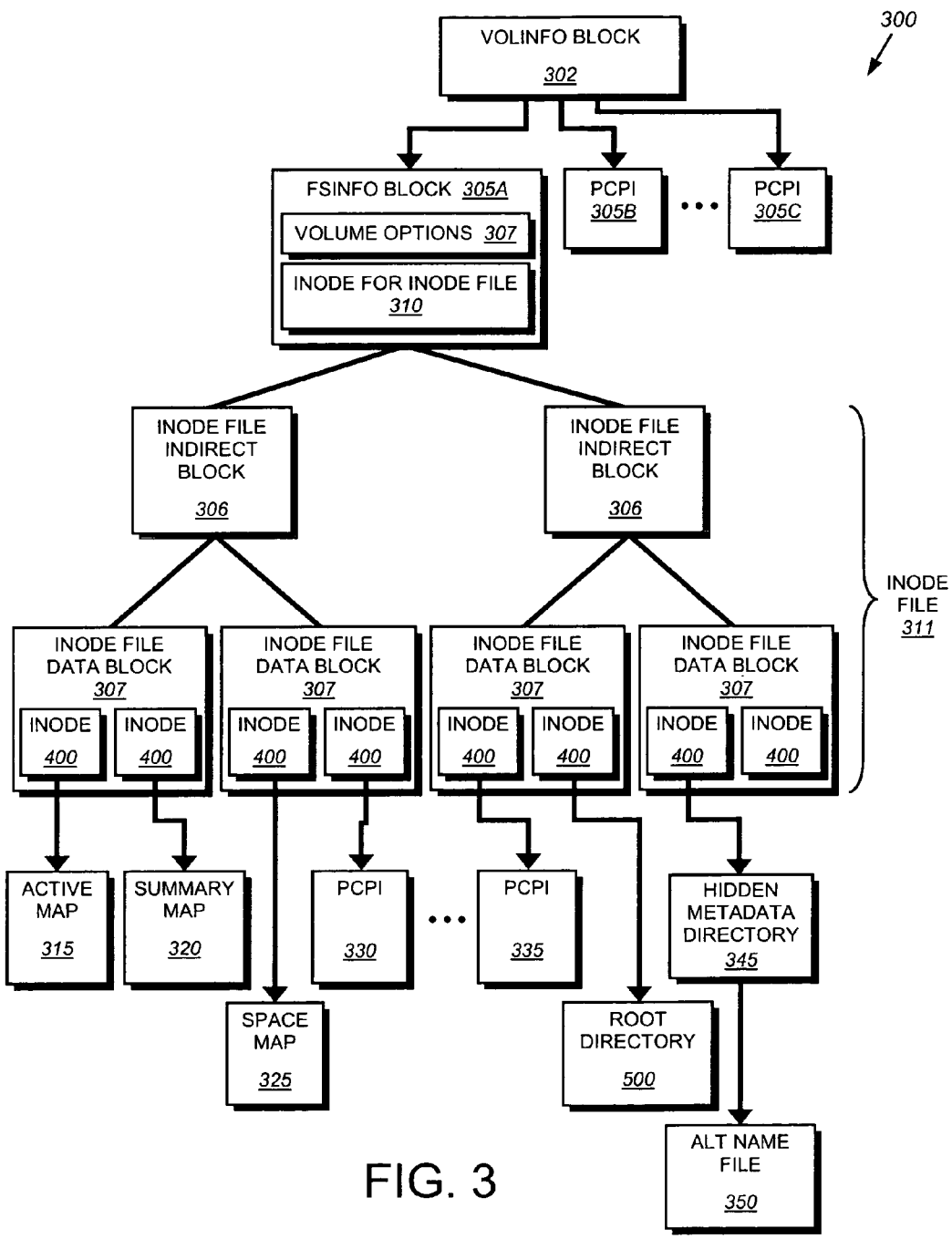
FIG. 3 is a schematic block diagram of an exemplary volume buffer tree in accordance with an embodiment of the present invention.

FIG. 3 is a schematic block diagram of an exemplary on-disk storage structure 300 of a volume of a storage system. As noted, a volume is typically associated with a file system and comprises data blocks organized within a vbn space. Each volume has a fsinfo block that is preferably stored at a fixed location within, e.g., a RAID group. A volinfo block 302 is the root of the volume. The volinfo block contains pointers to one or more fsinfo blocks 305A, B, C. Fsinfo block 305A is associated with the active file system, while fsinfo blocks 305B, C may be associated with PCPIs of the volume 300. An example of PCPIs associated with a volinfo block 302 is described in U.S. patent application Ser. No. 10/777,979, entitled TECHNIQUE FOR INCREASING THE NUMBER OF PERSISTENT CONSISTENCY POINT IMAGES IN A FILE SYSTEM, by Emily Eng, et al.

The fsinfo block 305A includes a variety of metadata that describes the state of the file system. Fsinfo block 305A contains a set of volume options 307 including whether I2P mapping is active for the volume 300. In the illustrative embodiment, I2P mapping may be activated/deactivated on a per volume basis. An administrator may activate the I2P mapping using a command line interface (CLI) command implemented by the UI 275 of the storage operating system 200. An example of such a CLI command is the following volume command:

vol options<volume name>i2p [on|off]

where vol is the name of the command and options denotes that the administrator desires to modify one of the volume options. The volume is identified in the <volume name> field. The i2p setting specifies whether the I2P mapping option is to be activated (on) or deactivated (off). In an illustrative embodiment, the volume may default to activating the I2P mapping. Illustratively, the storage operating system 200 includes a programmatic remote procedure call (RPC) interface that provides the same functionality as that available via CLI commands embodied within the UI 275.

The fsinfo block 305A also contains an inode for an inode file 310. All modes of the write-anywhere file system are organized into the inode file 310. Like any other file, the inode of the inode file is the root of the buffer tree that describes the locations of blocks of the file. As such, the inode of the inode file may directly reference (point to) 5 data blocks 307 of the inode file 310 or may reference indirect blocks 306 of the inode file 310 that, in turn, reference data blocks of the inode file. In this example, the inode for the inode file 310 includes an exemplary buffer tree comprising a plurality of inode file indirect blocks 306 that, in turn, point to inode file data blocks 307. Within each data block of the inode file are inodes 400, each of which serves as the root of a file. Among 10 the inodes of the inode file 310 are inodes for special metadata files, such as an active map 315, a summary map 320, a space map 325, a root directory 500 and a metadata directory 345. All user files in the file system are organized under the root directory 340, while various metadata files associated with the file system are stored under the metadata directory 345. Illustratively, the novel alternate name file 350 is located in the hidden metadata directory 345. In the illustrative embodiment, the alternate name file 350 is utilized to store I2P mapping information associated with alternate names of an inode. The alternate name file is illustratively implemented as a B+ tree to enable fast searches.

The inode file may further include inodes that reference a plurality of PCPIs 330, 335. These PCPI inodes are the root level inodes of PCPIs of the active file system. Each volume has special reserved inode numbers within its vbn space. In certain illustrative embodiments, a plurality of those inode numbers (e.g., 31) is reserved for PCPIs. When a PCPI of the active file system is generated, a copy of the inode for the inode file is also generated (hereinafter the "snapshot root") and assigned one of the reserved PCPI inode numbers. Thus, to access a PCPI at a particular point in time, the storage operating system accesses the appropriate PCPI root of the PCPI. In other illustrative embodiments, only the PCPI root inodes 305 are utilized.

D. Inode Structure

Figure 4:
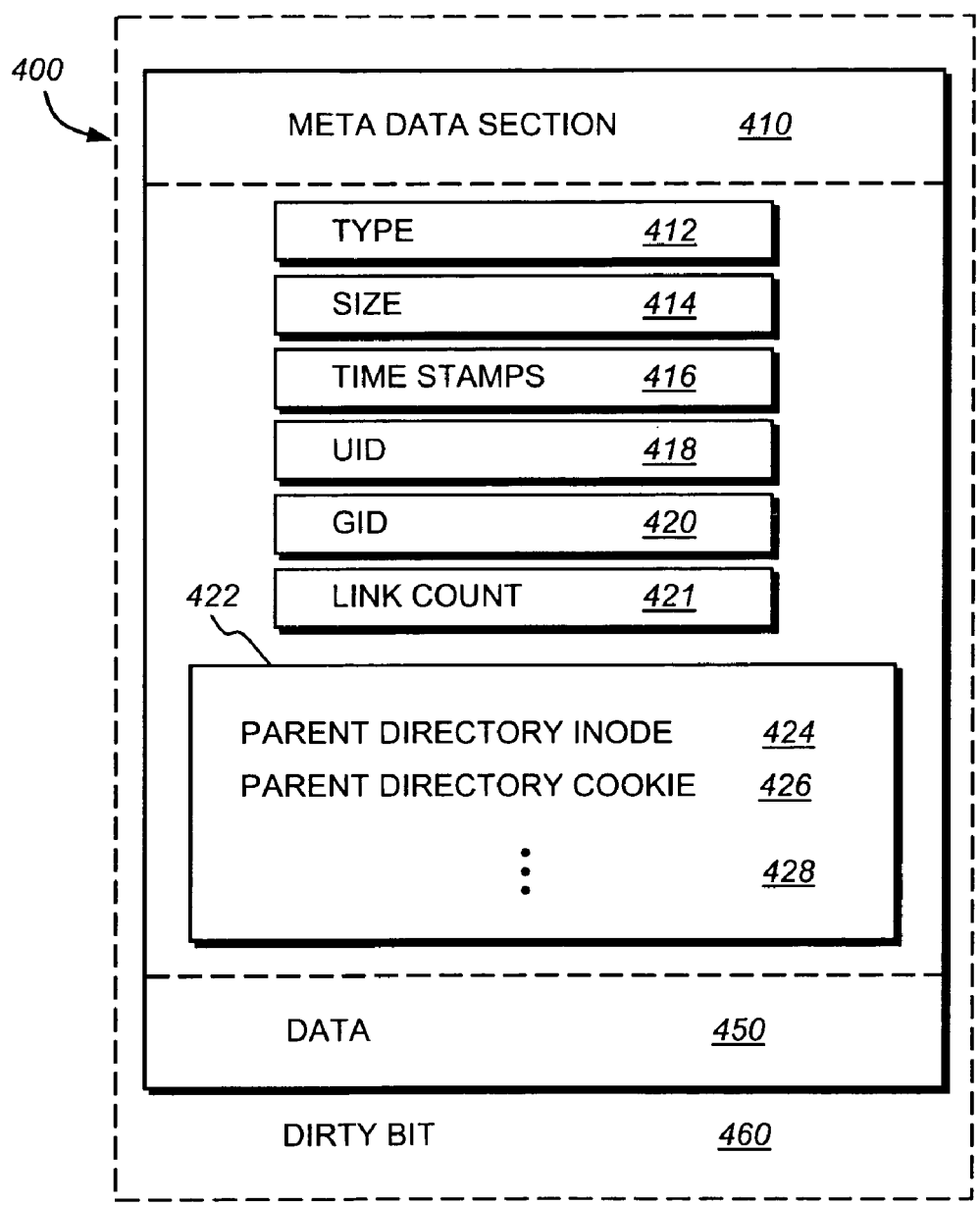
FIG. 4 is a schematic block diagram of an inode in accordance with an embodiment of the present invention.

In the illustrative embodiment, a data container, such as a file, is represented in the write-anywhere file system as an inode data structure adapted for storage on the disks 130. FIG. 4 is a schematic block diagram of an inode 400, which illustratively includes a metadata section 410 and a data section 450. The information stored in the metadata section 410 of each inode 400 describes the data container and, as such, includes the type (e.g., regular, directory, virtual disk) 412 of data container, the size 414 of the data container, time stamps (e.g., access and/or modification) 416 for the data container, ownership, i.e., user identifier (UID 418) and group ID (GID 420), of the data container, a link count field 421 and a novel primary name data structure 422. The link count field 421 tracks the number of names (and, implicitly, the number of hard links) associated with the inode. For example, a link count of 1 signifies that there are no hard links to the data container and that the only name associated with the inode is the primary name.

The novel primary name data structure 422 illustratively includes a parent directory inode field 424, a parent directory cookie field 426 and, in alternative embodiments, additional fields 428. The parent directory inode field 424 contains an inode value that is associated with the parent directory of the data container. Thus, if the data container is a file bar located in the foo directory (i.e., /foo/bar) then the parent directory inode field contains the inode number of the foo directory. The parent directory cookie field 426 illustratively contains a multi-bit value that illustratively identifies a directory block and entry within the directory block of the directory identified by the parent directory inode field 424.

The contents of the data section 450 of each inode may be interpreted differently depending upon the type of data container (inode) defined within the type field 412. For example, the data section 450 of a directory inode contains metadata controlled by the file system, whereas the data section of a file inode contains file system data. In this latter case, the data section 450 includes a representation of the data associated with the file.

Specifically, the data section 450 of a regular on-disk inode may include file system data or pointers, the latter referencing 4 KB data blocks on disk used to store the file system data. Each pointer is preferably a logical vbn to facilitate efficiency among the file system and the RAID system 240 when accessing the data on disks. Given the restricted size (e.g., 192 bytes) of the inode, file system data having a size that is less than or equal to 64 bytes is represented, in its entirety, within the data section of that inode. However, if the file system data is greater than 64 bytes but less than or equal to 64 KB, then the data section of the inode (e.g., a first level inode) comprises up to 16 pointers, each of which references a 4 KB block of data on the disk.

Moreover, if the size of the data is greater than 64 KB but less than or equal to 64 megabytes (MB), then each pointer in the data section 450 of the inode (e.g., a second level inode) references an indirect block (e.g., a first level block) that illustratively contains 1024 pointers, each of which references a 4 KB data block on disk. For file system data having a size greater than 64 MB, each pointer in the data section 450 of the inode (e.g., a third level inode) references a double-indirect block (e.g., a second level block) that contains 1024 pointers, each referencing an indirect (e.g., a first level) block. The indirect block, in turn, that contains 1024 pointers, each of which references a 4 KB data block on disk. When accessing a file, each block of the file may be loaded from disk 130 into the buffer cache 170.

When an on-disk inode (or block) is loaded from disk 130 into buffer cache 170, its corresponding in-core structure embeds the on-disk structure. For example, the dotted line surrounding the inode 400 indicates the in-core representation of the on-disk inode structure. The in-core structure is a block of memory that stores the on-disk structure plus additional information needed to manage data in the memory (but not on disk). The additional information may include, e.g., a "dirty" bit 460. After data in the inode (or block) is updated/modified as instructed by, e.g., a write operation, the modified data is marked "dirty" using the dirty bit 460 so that the inode (block) can be subsequently "flushed" (stored) to disk. The in-core and on-disk format structures of the WAFL file system, including the inodes and inode file, are disclosed and described in the previously incorporated U.S. Pat. No. 5,819,292 titled METHOD FOR MAINTAINING CONSISTENT STATES OF A FILE SYSTEM AND FOR CREATING USER-ACCESSIBLE READ-ONLY COPIES OF A FILE SYSTEM by David Hitz et al., issued on Oct. 6, 1998.

Figure 5:
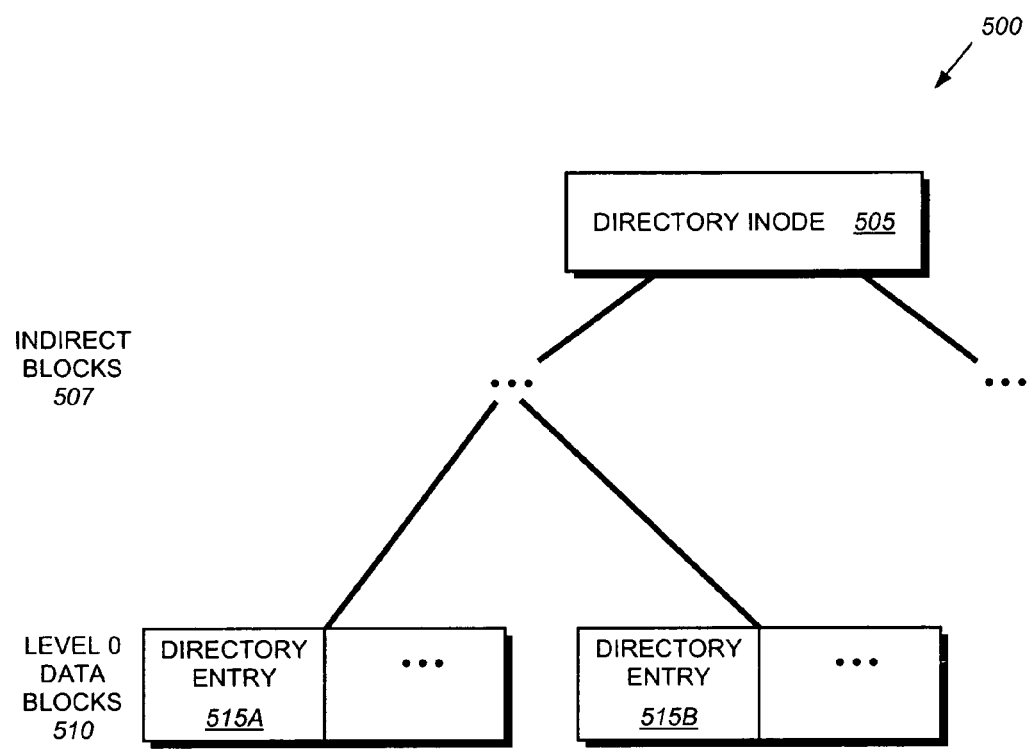
FIG. 5 is a schematic block diagram of an exemplary directory buffer tree in accordance with an embodiment of the present invention.

FIG. 5 is a schematic block diagram of an exemplary directory buffer tree 500 in accordance with an embodiment of the present invention. The directory buffer tree 500 contains a directory inode 505 at its root. Depending on the size of the directory, there may be one or more levels of indirect blocks 507 between the directory inode 505 and the data blocks 510 of the directory. Each data block 510 comprises one or more directory entries 515 A,B. In accordance with the illustrative embodiment of the present invention, the parent directory cookie value 426 uniquely identifies a particular directory entry within the directory identified by the parent directory inode field 424. That is, the inode identified by the parent directory inode field 424 identifies a directory inode 505. The parent directory cookie value 426 identifies a particular level 0 data block 510 of the directory and a particular directory entry 515 within that level 0 data block 510.

E. I2P Mapping

The present invention provides a system and method for maintaining I2P mapping from a data container to its parent directory within a file system of a storage system. A metadata section of each inode is modified to include a primary name data structure that illustratively comprises an inode number associated with the parent directory of the data container (a "parent directory inode") and a parent directory cookie value. The parent directory cookie value identifies a specific directory block and entry within the directory structure associated with the parent directory inode. To identify the pathname of the data container, the file system includes a set of I2P functions that cooperate to load the identified directory entry using the information stored in the primary name data structure. This I2P information may then be utilized in displaying the primary name of the data container to, e.g., an administrator.

Additionally, an alternate name file is generated and stored in a hidden metadata directory of the file system. The alternate name file illustratively utilizes a B+ tree design wherein each key is a triplet comprising the inode number of the data container, a parent directory inode number and a cookie value. The inode number identifies the inode of the data container to which this name refers. The parent directory inode and cookie value identify a directory, block and directory entry containing the pathname associated with the alternative name. The B+ tree structure is stored in the alternate name file within the file system for persistent storage of the information. It should be noted that in alternate embodiments, the alternate name file may utilize data structures other than a B+ tree. For example, a binary tree or other tree structure may be utilized. Alternately, the alternate name file may comprise of any suitable data container construct suitable for storing the alternate name information therein.

Figure 6:
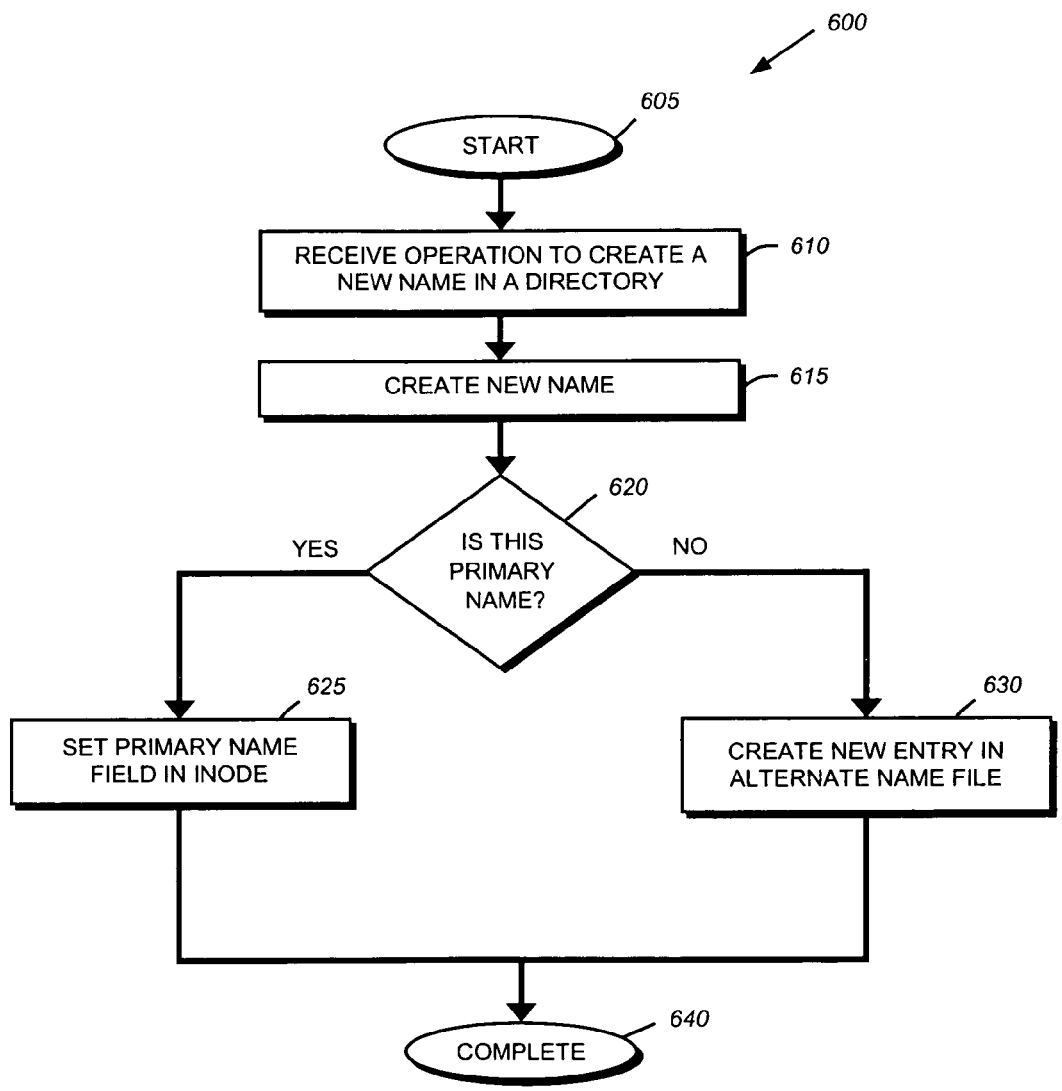
FIG. 6 is a flowchart detailing the steps of a procedure for creating a new name and associated inode to pathname mapping information in accordance with an embodiment of the present invention.

FIG. 6 is a flowchart detailing the steps of a procedure 600 for creating a new name in a directory in accordance with an embodiment of the present invention. Procedure 600 is illustratively performed by the file system and associated I2P functions when a data container is first created and/or a new hard link is generated to a particular data container. The procedure 600 begins in step 605 and continues to step 610 where the file system receives an operation to create a new name in a particular directory. As noted above, the operation may be a create file operation or a create hard link operation. In response, the file system creates the new name in step 615 using conventional file system operations. In step 620, the file system, in conjunction with the I2P functions 284, determine whether the new name is the primary name for the data container. If, for example, the operation is a create file operation, the new name is the primary name because the data container is associated with no other name. However, if the operation is a create hard link operation, then the data container already has a primary name reflecting the name of the data container originally created. If the new name is the primary name, the procedure branches to step 625 where the file system and I2P functions load the appropriate fields within the primary name data structure within the inode. The procedure then completes in step 640. However, if in step 620, a determination is made that the new name is not the primary name, then the procedure continues to step 630 where the file system and I2P functions create a new entry in the alternate name file. As noted above, this entry is illustratively stored as a triplet of the inode, the parent directory inode and the parent directory cookie value. The procedure then completes in step 635.

Figure 7:
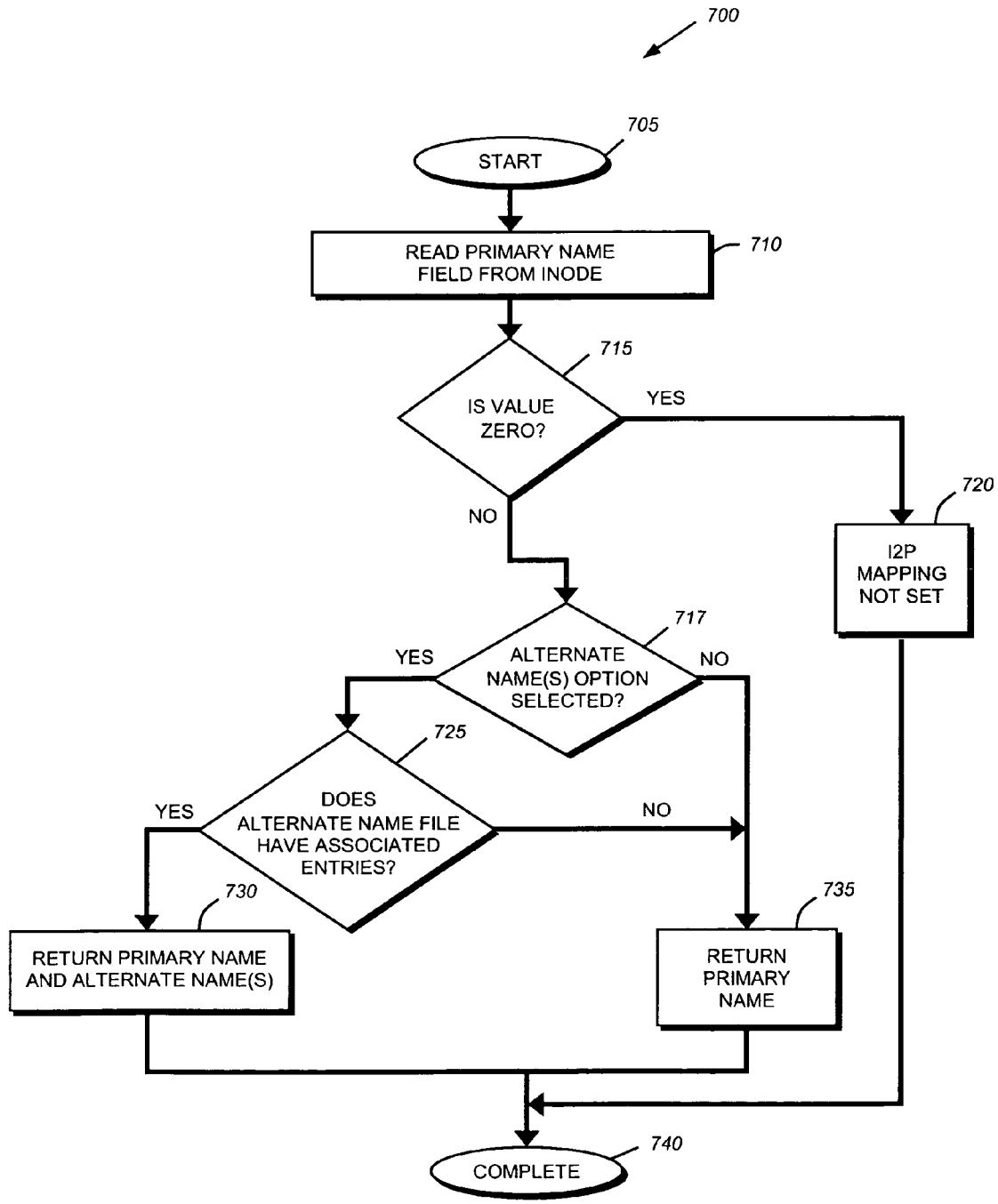
FIG. 7 is a flowchart detailing the steps of a procedure for retrieving inode to pathname mapping information in accordance with an embodiment of the present invention.

FIG. 7 is a flowchart detailing the steps of a procedure 700 for retrieving I2P information in accordance with an embodiment of the present invention. This procedure may be invoked by an administrator or user entering a command to retrieve the I2P information in response to, e.g., a message reporting an error condition with respect to a particular inode number. An exemplary CLI command for retrieving I2P mapping information, which may be implemented by the UI 275, is:

inodepath –v <volume> [–a][–s <PCPIname>]<inodenumber> where the –v option identifies the volume name identified in the <volume> field in which the inode number identified in the <inodenumber> field is located. Illustratively, the –a option causes the command to print all of the names associated with the inode, i.e., the primary name and all alternate names associated with the inode. In an exemplary embodiment the program defaults to only displaying the primary name. The –s option causes the program to display the name(s) associated with the inode number <inodenumber> located within the PCPI having the name <PCPIname>. Thus, the program may display names associated with previous point in time images of the file system. In the illustrative embodiment the CLI command utilizes the I2P functions 284 of the storage operating system 200 to retrieve and display the information to the administrator.

The procedure 700 begins in step 705 and continues to step 710 where the file system and I2P functions retrieve (read) the primary name data structure from the inode. In step 715, the file system and I2P functions determine whether the primary name data structure contains a zero value. Illustratively, a zero value within the primary name data structure signifies that the file system has not yet identified the appropriate I2P mapping information for this inode. This may be because an initial scan, described further below, has not yet reached this particular inode or may be due to corruption of the information which has resulted in the file system clearing the I2P information to prevent incorrect results being returned. If the primary name data structure within the inode contains a zero value, the procedure branches to step 720 signifying that the I2P mapping information is not set before completing in step 740. Illustratively, a caller or program invoking procedure 700 will return to the user information signifying that the I2P mapping information is not available. In alternate embodiments, if the primary name data structure is zero, then the file system invokes the scanner, described further below, to generate the appropriate information. In such alternative embodiments the scanner, which is part of the I2P functions 284, generates the appropriate primary name data structure contents before reinitiating procedure 700.

If, in step 715, the value is not zero then the procedure continues to step 717 where a determination is made whether the option, e.g., –α, has been selected to display alternate names. If the alternate names option has not been set, the procedure branches to step 735 and returns the primary name before completing in step 740.

However, if in step 717 it is determined that the administrator desires to display alternate names, the procedure continues to step 725 where a determination is made as to whether the alternate name file contains entries associated with this inode. If the alternate names file does not contain any associated entries, then the data container only has a primary name, which is returned in step 735 before the procedure completes in step 740. The primary name is determined by examining the directory entry in the appropriate directory that is identified by the cookie value within the primary name data structure. However, if in step 725 there are alternate names identified, then the file system returns the primary name and the alternate name(s) in step 730 before completing in step

740. The alternate name(s) are identified in a similar manner to the primary name, i.e., the directory is identified by the parent directory inode and a specific entry within the directory is identified by the cookie value.

Figure 8:
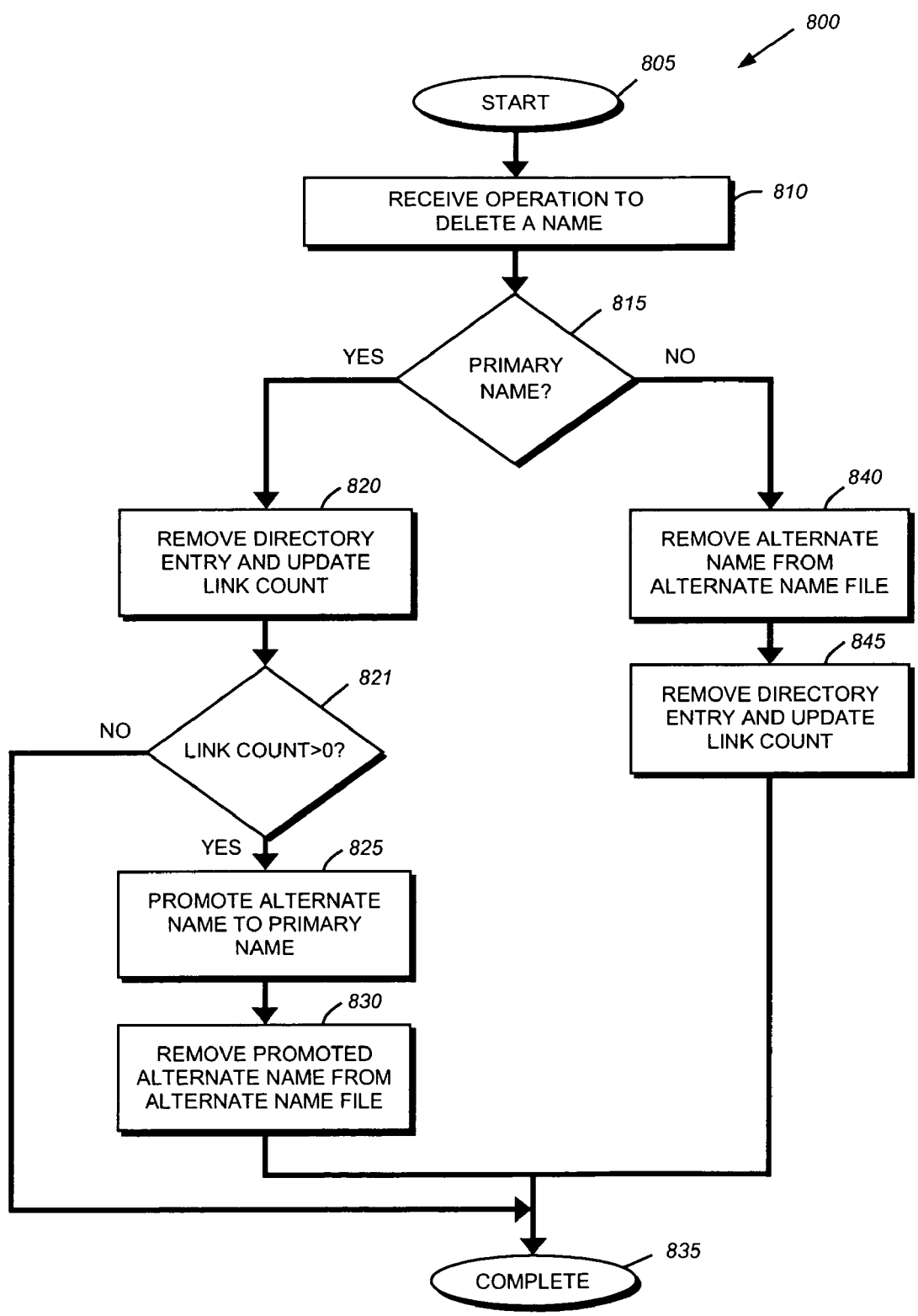
FIG. 8 is a flowchart detailing the steps of a procedure for deleting a name and associated inode to pathname mapping information in accordance with an embodiment of the present invention.

FIG. 8 is a flowchart detailing the steps of a procedure 800 for deleting a name in accordance with an embodiment of the present invention. The procedure 800 begins in step 805 and continues to step 810 where an operation to delete a name is received by the file system. The file system, in conjunction with I2P functions 284, perform procedure 800 to remove the name and to ensure that I2P mapping information remains up to date. A determination is made in step 815 whether the name to be deleted is the primary name associated with the inode, i.e., the name stored in the primary name data structure within the inode. If the name to be deleted is the primary name, the procedure branches to step 820 where the file system and I2P functions remove the appropriate directory entry and update the link count of the inode.

Once the directory entry has been removed and the link count updated, the procedure determines, in step 821, whether the link count is greater than zero for the inode. If the link count is not greater than zero, then the procedure branches to step 835 and completes. An inode will have a link count when the one and only name associated with is removed, thereby indicating that the data container associated with the inode may be removed from the file system.

Then, in step 825, an alternate name of the data container is "promoted" to the primary name. Illustratively, the first alternate name stored in the alternate name file is selected and stored within the primary name data structure of the inode as the new primary name. Once the newly promoted primary name has been stored, the file system and I2P functions then remove the promoted alternate name from the alternate name file in step 830 before the procedure completes in step 835. However, if in step 815, it is determined that the name to be deleted is not the primary name, the procedure branches to step 840 where the name is removed from the alternate name file. This may be accomplished using conventional B+tree removal operations. In alternate embodiments, where the alternate name file is not implemented as a B+tree, appropriate conventional entry removal operations are utilized. Then, in step 845, the appropriate directory entry is removed and the link count of the inode is updated before the procedure completes in step 835.

Figure 9:
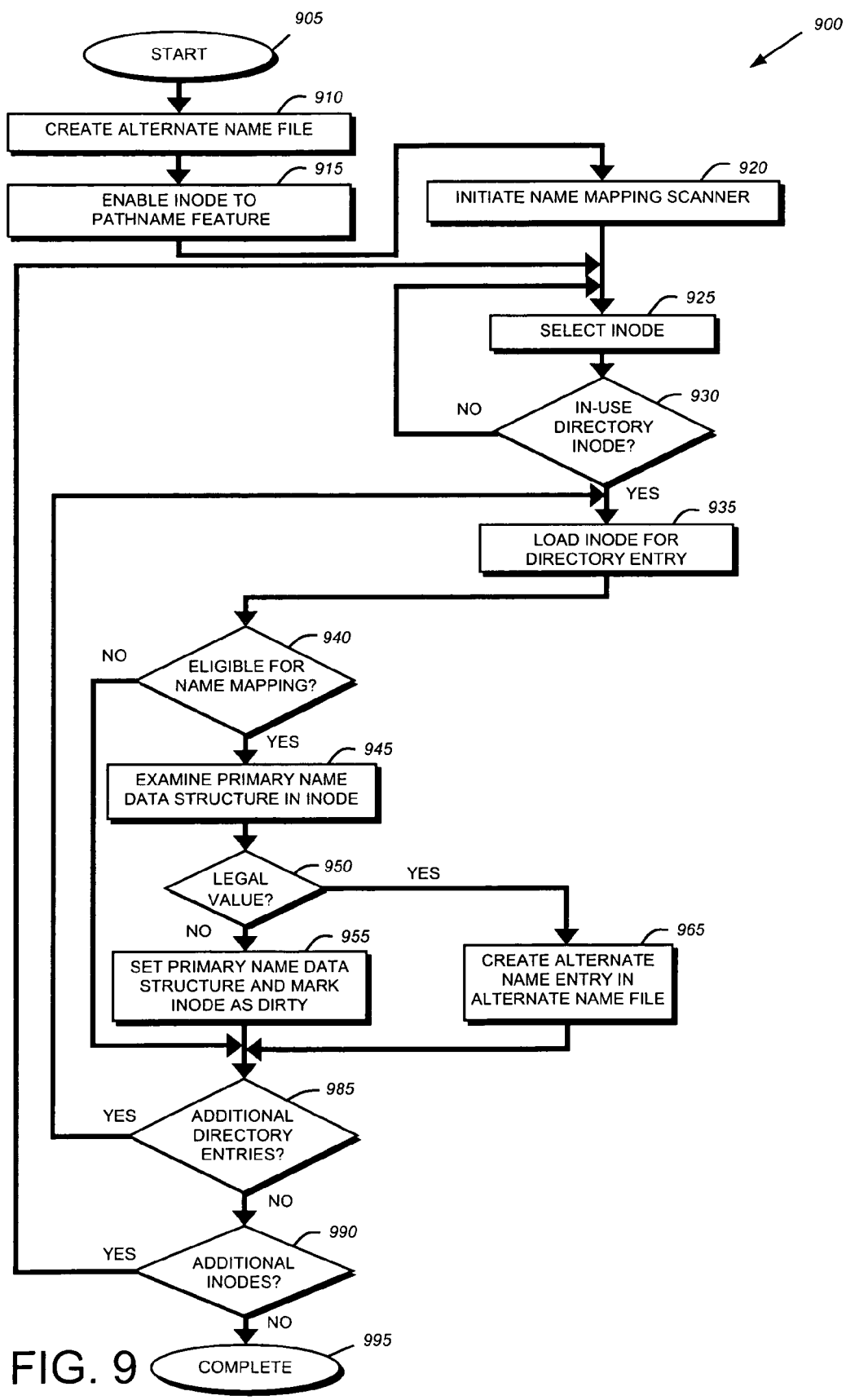
FIG. 9 is a flowchart detailing the steps of a procedure for installing inode to pathname mapping information in a file system in accordance with an embodiment of the present invention.

FIG. 9 is a flowchart of a procedure 900 for installing the I2P mapping information in accordance with an embodiment of the present invention. Such a procedure 900 may be performed when a new volume is created or when I2P mapping information is first activated for a volume. The procedure 900 may also be initialized when a file system is upgraded from one that does not support I2P mapping to one that does. Additionally, should any file system consistency tools detect that the I2P information is corrupt or inconsistent, the tools may initialize the procedure 900 to reinitialize the I2P information within the file system. Illustratively, the I2P functions 284, including a name mapping scanner described further below, perform the various steps of procedure 900.

The procedure 900 begins in step 905 and continues to step 910 where the alternate name file is created. The alternate name file is illustratively stored within a hidden metadata directory so that it is not user visible. In the illustrative embodiment, the alternate name file comprises a B+ tree data structure that stores triplets; however, in alternate embodiments, the alternate name file may utilize differing data structures and/or may be stored in differing locations. As such, the description of the alternate name file should be taken as exemplary only. As there are no alternate names at this point in time, the alternate name file is empty. In step 915, the I2P feature is then marked as active for this volume by, for example, setting a particular setting within the fsinfo block associated with the volume.

A name mapping scanner, which is illustratively part of I2P functions 284, is then initiated in step 920. The name mapping scanner selects an inode in step 920 and determines, in step 930, whether the selected inode is an in-use directory inode. If it is not an in-use directory inode, the name mapping scanner loops back to step 925 and selects another inode. However, if the selected inode is an in-use directory inode, the name mapping scanner continues to step 935 where it loads an inode associated with a directory entry within the directory identified by the selected in-use directory inode.

The name mapping scanner then determines whether the selected directory entry is eligible for name mapping (step 940). Certain data containers within a file system illustratively do not have associated I2P mapping information. Such data containers comprise, for example, directories and metadata files, including the above-described snap-maps. More generally, any data container that is not user visible does not include I2P mapping information in the illustrative embodiment. If the selected directory entry is not eligible for name mapping, the procedure branches to step 985 where the name mapping scanner determines whether additional directory entries exist under the selected in-use directory inode. If so, the scanner loops back to step 935 and loads the inode for a next directory entry. If there are no additional directory entries, the name mapping scanner continues to step 990 and determines whether there are additional inodes within the inode file. If so, the scanner loops back to step 925 and selects another inode. If there are no additional inodes, the name mapping scanner then completes in step 995.

However, if in step 940 it is determined that the inode for the directory entry is eligible, the name mapping scanner then continues to step 945 where it examines the primary name data structure within the inode and determines whether it has a legal value in step 950. A legal value is defined as a value that signifies that primary name information has been set. An example of a non-legal value is where the primary name data structure is zero, which illustratively signifies that there is no current primary name information stored within the primary name data structure. If the primary name data structure does not have a legal value, the name mapping scanner sets the primary name data structure based on the inode and directory entry utilized to access the inode and marks the inode as dirty in step 955. By modifying the inode and marking it as dirty, the inode will be written to disk by the file system. The name mapping scanner then continues to step 985 and determines whether additional directory entries exist. The procedure continues as described above.

If, in step 950, a determination is made that the primary name data structure within the inode has a legal value, then the name mapping scanner has located an alternate name for the data container and the procedure branches to step 965 and creates the appropriate alternate name entry in the alternate name file. The name mapping scanner then continues on to step 985 where the program flow continues as described above.

Figure 10:
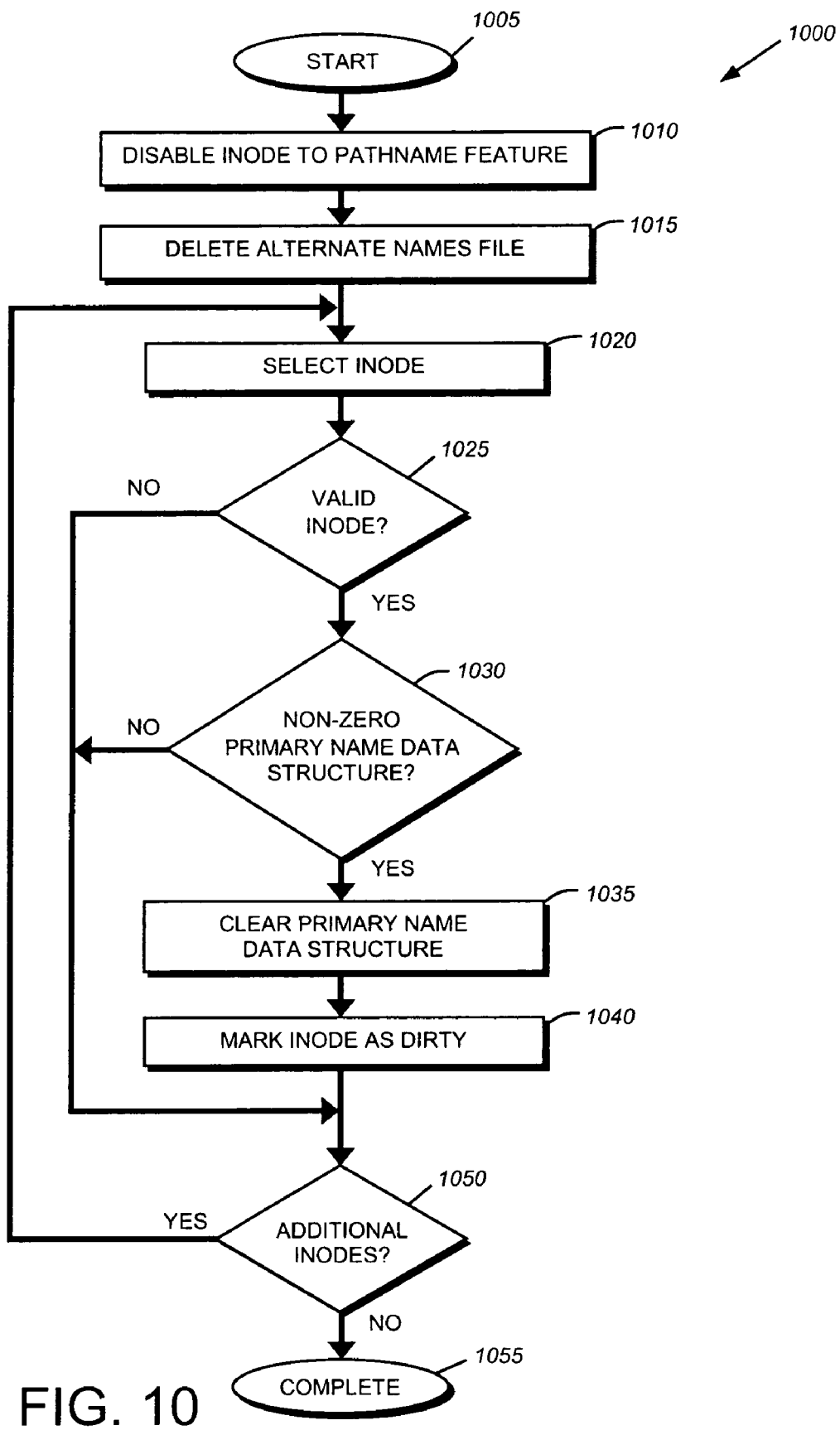
FIG. 10 is a flowchart detailing the steps of a procedure for removing inode to pathname mapping information from a file system in accordance with an embodiment of the present invention.

FIG. 10 is a flowchart detailing the steps of a procedure 1000 for removing I2P mapping information in accordance with an embodiment of the present invention. The I2P mapping information may be removed when, for example, a file system is reverted to an earlier version that does not support I2P mapping information. Alternately, the I2P information may be removed if a determination is made that there are serious inconsistencies with the data. Such removal may be immediately followed by a new scan such as that performed by the name mapping scanner described above in reference to FIG. 9. The procedure 1000 begins in step 1005 and continues to step 1010 where the I2P feature is disabled by, for example, asserting an appropriate flag within the fsinfo block. Assertion of the flag signifies that the I2P feature has been disabled and subsequent operations will not attempt to read the I2P information for this particular volume. The alternate name file is then deleted in step 1015. A reversion scanner is then begun that performs a series of steps to remove the primary name information from the inodes within the file system. An inode is selected by the reversion scanner in step 1020 and a determination is made in step 1025 whether it is a valid inode. If the inode is not valid, the reversion scanner branches to step 1050 to determine if there are additional modes. If there are additional inodes, the reversion scanner branches back to step 1020 and selects another inode. Otherwise, the procedure completes in step 1055

However, if, in step 1025, it is determined that the selected inode is valid, the reversion scanner determines whether the primary name data structure has a non-zero value in step 1030. If the value is non-zero (signifying that there is valid information contained therein), the primary name data structure within the inode is cleared in step 1035 before the inode is marked as dirty in step 1040. Clearing of the primary name data structure is illustratively performed by zeroing that data structure. However, in alternate embodiments other forms of marking the primary name data structure to indicate that I2P mapping information is not present may be utilized. As noted above, by marking the inode dirty the newly modified inode will be written to disk by the file system. The reversion scanner then determines if there are additional directory entries in step 1045. If so, the procedure loops back to step 1030 where the reversion scanner loads the inode for another directory entry. If there are no additional directory entries in step 1045, the reversion scanner determines (step 1050) whether there are additional inodes. If so, the procedure loops back to step 1020 where the reversion scanner selects another inode. If there are no additional inodes to be examined in step 1050, the reversion scanner then completes in step 1055.

The foregoing description has been directed to specific embodiments of this invention. It will be apparent, however, that other variations and modifications may be made to the described embodiments, with the attainment of some or all of their advantages. For instance, it is expressly contemplated that the teachings of this invention can be implemented as software, including a computer-readable medium having program instructions executing on a computer, hardware, firmware, or a combination thereof. Accordingly this description is to be taken only by way of example and not to otherwise limit the scope of the invention. Therefore, it is the object of the appended claims to cover all such variations and modifications as come within the true spirit and scope of the invention.

What is claimed is:

1. A method for maintaining a mapping from a data container to a parent directory within a file system of a storage operating system, comprising:
    providing a primary name data structure within an inode associated with the data container having a parent directory inode field and a parent directory cookie field, the primary name data structure identifying a primary name associated with the inode and mapping the data container to its parent directory within the file system of the storage operating system, the primary name persistently stored within the file system, wherein the parent directory cookie field identifies a specified directory entry within a specified directory block of a directory identified by the parent directory inode field;
    providing an alternate name data container storing a plurality of alternate names associated with the inode, the alternate name data container including a file organized as B+ tree;
    storing the alternate name data container within a hidden metadata directory of the file system of the storage operating system, wherein the alternate name data container is persistently stored within the file system; and
    identifying, by the file system, a pathname to the data container using information stored in the primary name data structure.

2. The method of claim 1 wherein the data container comprises a file.

3. The method of claim 1 wherein the data container comprises a virtual disk.

4. The method of claim 1, wherein the primary name data structure includes an inode number associated with a parent directory of the data container and a parent directory cookie.

5. The method of claim 1, wherein the alternate name data container stores a plurality of entries, wherein each entry includes an inode number that identifies the inode associated with the data container, a parent directory inode number and a cookie value that identify a directory block and a directory entry containing a pathname associated with the alternate name.

6. The method of claim 1, wherein the alternate name data container allows a full pathname to be determined by walking up parent entries stored in a well-known location in each directory.

7. A system for maintaining a mapping from a data container to a parent directory, the system comprising:
    a computer implementing a file system, the file system configured to store a primary name data structure in an inode associated with the data container having a parent directory inode field and a parent directory cookie field, and to map the data container to its parent directory within the file system, wherein the primary name is persistently stored within the file system wherein the parent directory cookie field identifies a specified directory entry within a specified directory block of a directory identified by the parent directory inode field;
    the file system configured to store an alternate name data container, the alternate name data container storing a plurality of alternate names associated with the inode and including a file organized as a B+ tree;
    the file system configured to store the alternate name data container in a hidden metadata directory of the file system, wherein the alternate name data container is persistently stored within the file system; and
    the file system further configured to identify a pathname to the data container using information stored in the primary name data structure.

8. The system of claim 7 wherein the data container comprises a file.

9. The system of claim 7 wherein the data container comprises a virtual disk.

10. A method for maintaining a mapping from a data container to a parent directory within a file system of a storage operating system, comprising:
    creating a new name associated with the data container;
    determining whether the created name is a primary name associated with the data container;
    in response to determining that the created name is the primary name associated with the data container, setting a primary name data structure in the inode associated with the data container and mapping the data container to its parent directory within the file system of the storage operating system wherein the primary name is persistently stored within the file system, the primary name data structure having a parent directory inode field and a parent directory cookie field wherein the parent directory cookie field identifies a specified directory entry within a specified directory block of a directory identified by the parent directory inode field;

in response to determining that the created name is not the primary name associated with the data container, creating a plurality of alternate names in an alternate name data container wherein the alternate name data container includes a file organized as a B+ tree; and storing the alternate name data container in a hidden metadata directory of the file system of the storage operating system, wherein the alternate name data container is persistently stored within the file system.

11. A method, comprising:

modifying a metadata section of each inode of a data container to include a primary name data structure, wherein the primary name data structure includes an inode number associated with a parent directory of the data container and a parent directory cookie, wherein the parent directory cookie identifies a specific directory block and entry within a directory structure associated with the parent directory;

generating an alternate name data container storing a plurality of entries, wherein each entry includes an inode number that identifies the inode associated with the data container, a parent directory inode number and a cookie value that identify a directory block and a directory entry containing a pathname associated with the alternate name wherein the alternate name data container includes a file organized as a B+ tree;

storing the alternate name data container within a hidden metadata directory of the file system of a storage operating system, wherein the alternate name data container is persistently stored within the file system; and identifying, by a file system, a pathname to the data container using information stored in the primary name data structure.

* * * * *

UNITED STATES PATENT AND TRADEMARK OFFICE
CERTIFICATE OF CORRECTION

PATENT NO. : 7,739,318 B2
APPLICATION NO. : 11/156679
DATED : June 15, 2010
INVENTOR(S) : Edward R. Zayas et al.

Page 1 of 1

It is certified that error appears in the above-identified patent and that said Letters Patent is hereby corrected as shown below:

In the Specification

In col. 10, line 63 should read:
file 310. All ~~modes~~ inodes of the write-anywhere file system are In col. 11, line 7 should read:
each of which serves as the root of a file. Among ~~10~~ the inodes In col. 17, line 15 should read:
1050 to determine if there are additional ~~modes~~inodes. If there are Signed and Sealed this
Second Day of July, 2013

Teresa Stanek Rea
*Acting Director of the United States Patent and Trademark Office*